Patented Mar. 12, 1940

2,193,662

UNITED STATES PATENT OFFICE 2,193,662

PLASTICIZED POLYVINYL HALIDES

Claude H. Alexander, Cuyahoga Falls, Ohio, assignor to The B. F. Goodrich Company, New York, N. Y., a corporation of New York No Drawing. Application August 2, 1938, Serial No. 222,674

6 Claims. (Cl. 260—88)

This invention relates to polyvinyl halides, and has as its object to provide plasticized polyvinyl halide compositions which have improved heat- and-light stability and which retain their flexibility at lower temperatures than the temperatures at which ordinary plasticized polyvinyl halides stiffen appreciably.

It is well known that polyvinyl halides in general may be plasticized by a number of materials such as aromatic hydrocarbons, chlorinated or nitrated aromatic hydrocarbons, aromatic or mixed aliphatic and aromatic esters, ethers, ketones, or esters of inorganic acids which are sufficiently non-volatile. The higher fatty acids and fatty oils and other esters of the high fatty acids, however, do not, in general, appreciably plasticize polyvinyl halides, even at fairly high temperatures.

I have discovered that alkoxyalkyl esters of higher aliphatic carboxylic acids may be incorporated in plasticized polyvinyl halide compositions to produce heat- and light-stable compositions which retain their flexibility at low temperatures. Any type of polyvinyl halide such as alpha, beta, or gamma polyvinyl chloride, polyvinyl bromide, or even polyvinyl halide compositions formed by the conjoint polymerization of a vinyl halide and other polymerizable compounds such as vinyl acetate may be stabilized with the materials of this invention. Since the plasticized gamma polyvinyl chlorides described in U. S. Patent No. 1,929,453 issued to Waldo L. Semon show the greatest commercial promise, the invention will be described in detail with reference to these materials, though it is to be understood that the invention is equally applicable to other polyvinyl halides as set forth above.

The stabilizers of this invention are all alkoxyalkyl esters of higher aliphatic carboxylic acids containing at least 10 carbon atoms. Included in the scope of the invention, accordingly, are such compounds as 2-methoxyethyl oleate, 2-ethoxyethyl oleate, 2-(2-ethoxyethoxy) ethyl oleate, di(2-ethoxyethyl) sebacate, the 2-methoxyethyl ester of acetyl ricinoleic acid, etc. Other alkoxyalkyl esters of higher saturated and unsaturated fatty acids such as linoleic acid, erucic acid, stearic acid, palmitic acid, lauric acid, etc., may also be incorporated in plasticized polyvinyl halides to achieve the objects of this invention.

The stabilizer may be added at any time during the polymerization of the vinyl chloride or the plasticization of the same though it is preferably added before the composition is heat molded. A small proportion of the stabilizer, from .1% to 5% for instance, may conveniently be dissolved in the plasticizer, if the two are compatible, and added to the composition therewith. Alternately, the plasticized composition may be prepared and the stabilizer added on the mill. Irrespective of the method of preparation, the resulting composition is much more resistant to heat and light discoloration than a similar composition containing no stabilizer. Thus, a composition containing gamma polyvinyl chloride 57 parts by weight, tricresyl phosphate 43 parts, and 2-methoxyethyl oleate 3 parts is lighter in color after heat-molding than a composition containing no stabilizer. Compositions plasticized with tricresyl phosphate alone rapidly lose their flexibility at temperatures below freezing, and when low enough temperatures are reached, they become so hard and brittle that they are easily cracked. A composition containing gamma polyvinyl chloride 57 parts, tricresyl phosphate 28 parts and 2-methoxyethyl oleate 15 parts, on the other hand, remains flexible at temperatures around —30° C. and even lower. Another composition having good low temperature flexibility contains gamma polyvinyl chloride 57 parts, tricresyl phosphate, 33 parts and di-(2-ethoxyethyl) sebacate 10 parts. The stabilizers may be included in the compositions in amounts up to about equal the weight of the plasticizer, higher proportions of stabilizer not being ordinarily preferred since compositions having decreased tensile strength are obtained.

The compositions of this invention may contain, besides the stabilizer, carbon black, zinc oxide, barytes, clay, wood flour, and other pigments and fillers commonly used in the rubber and plastics industries. The polyvinyl halides may also contain appreciable amounts of polyvinyl esters of aliphatic acids either conjointly polymerized therewith or incorporated therewith after polymerization.

Though I have herein disclosed specific embodiments of my invention, I do not intend to limit the invention solely thereto, for it is obvious that many modifications including substituting equivalent materials and varying the proportions of materials used are within the spirit and scope of the invention as defined in the appended claims.

I claim:

1. A composition of matter comprising gamma polyvinyl chloride, a plasticizer for the gamma polyvinyl chloride, and an alkoxyalkyl ester of a higher aliphatic carboxylic acid, said acid containing at least ten carbon atoms.

2. A composition of matter comprising gamma polyvinyl chloride, a plasticizer for the gamma polyvinyl chloride, and an alkoxyalkyl ester of sebacic acid.

3. A composition of matter comprising gamma polyvinyl chloride, a plasticizer for the gamma polyvinyl chloride, and di (2-ethoxyethyl) sebacate.

4. A composition of matter comprising gamma polyvinyl chloride, a plasticizer for the gamma polyvinyl chloride, and an alkoxyalkyl ester of a higher fatty acid, said acid containing at least ten carbon atoms.

5. A composition of matter comprising gamma polyvinyl chloride, a plasticizer for the gamma polyvinyl chloride, and an alkoxyalkyl ester of oleic acid.

6. A composition of matter comprising gamma polyvinyl chloride, a plasticizer for the gamma polyvinyl chloride, and 2-methoxyethyl oleate.

CLAUDE H. ALEXANDER.